United States Patent [19]

McNulty

[11] 4,109,200
[45] Aug. 22, 1978

[54] POSITION SENSING DIFFERENTIAL TRANSFORMER SYSTEM WITH MEANS TO CONVERT THE OUTPUT TO AN ABSOLUTE VALUE

[75] Inventor: Dennis A. McNulty, Tipp City, Ohio

[73] Assignee: A. O. Smith Corporation, Milwaukee, Wis.

[21] Appl. No.: 699,467

[22] Filed: Jun. 24, 1976

[51] Int. Cl.² .................................... G01R 33/12
[52] U.S. Cl. ............................ 324/208; 340/199; 33/174 L; 323/51; 318/657
[58] Field of Search ............. 324/34 R, 34 PS, 34 D; 340/199, 265; 33/143 L, 147 L, 147 N, 148 H, 172 E, 174 L, DIG. 5; 323/51; 318/656–666

[56] References Cited
U.S. PATENT DOCUMENTS

| | | | |
|---|---|---|---|
| 2,503,851 | 4/1950 | Snow | 33/172 E |
| 2,824,299 | 2/1958 | Haines et al. | 340/199 |
| 3,046,533 | 7/1962 | Torn et al. | 340/199 |
| 3,684,961 | 8/1972 | Muir | 340/199 |

Primary Examiner—Robert J. Corcoran
Attorney, Agent, or Firm—Andrus, Sceales, Starke & Sawall

[57] ABSTRACT

A stator lamination compression mechanism simultaneously monitors the axial length of a series of laminations to be used in an electric motor. A linear variable differential transformer provides a movable coupling element connected to a sensing member monitoring the axial length of the compressed laminations. A specially designed sensing circuit responds to variations in magnitude and phase of a single ended output signal provided by the differential transformer and continuously tracks the movement of the coupling element. The monitor provides warnings when the axial length varies beyond predetermined selected magnitudes.

11 Claims, 2 Drawing Figures

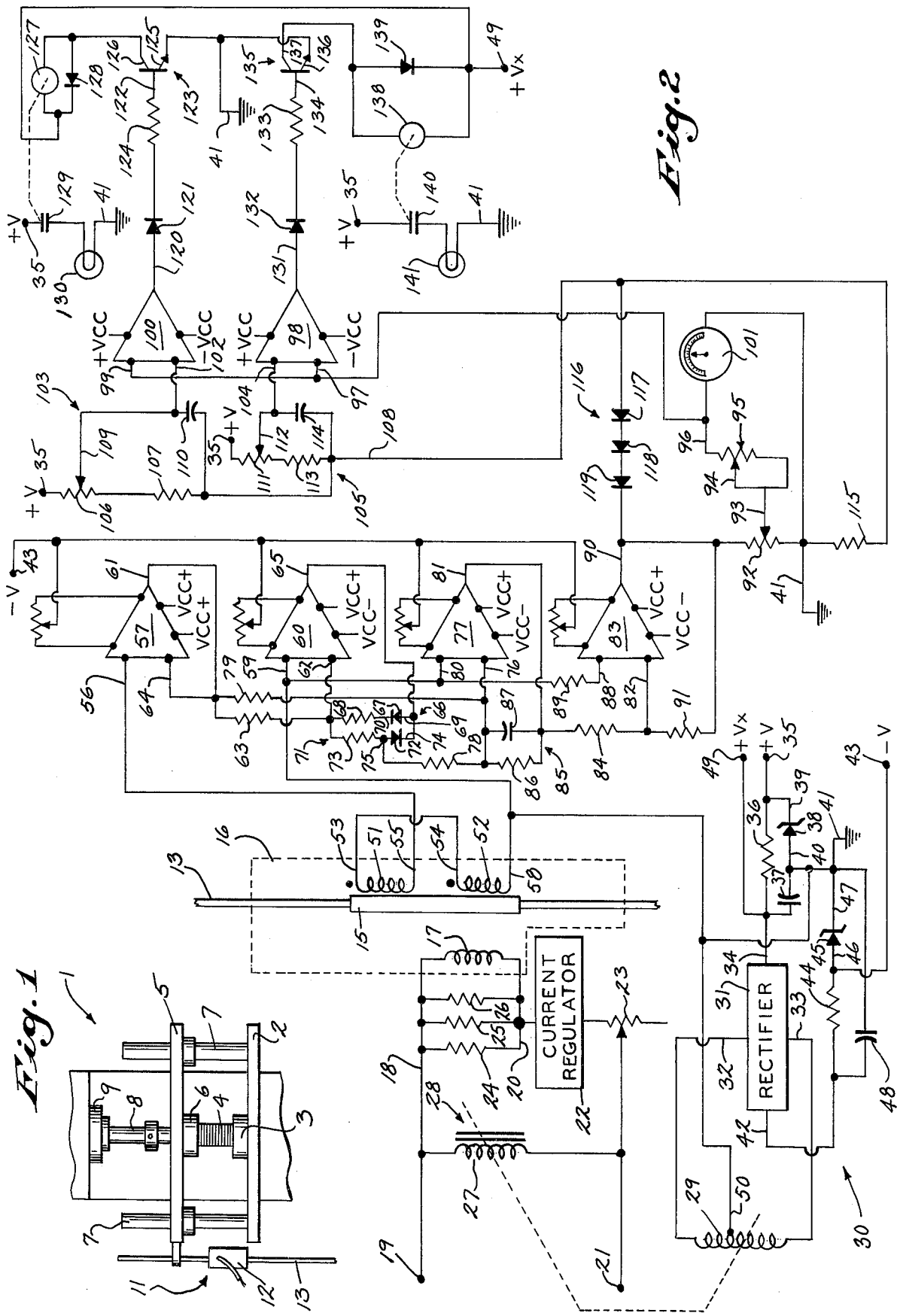

POSITION SENSING DIFFERENTIAL TRANSFORMER SYSTEM WITH MEANS TO CONVERT THE OUTPUT TO AN ABSOLUTE VALUE

BACKGROUND OF THE INVENTION

This invention relates to a measuring apparatus employing a sensing apparatus selectively monitoring the position of a sensing member and employing a variable differential transformer having a movable coupling element operatively connected to the sensing member.

There are many applications where it is desired to accurately monitor the location of a particular object with respect to some standard or reference. One such situation occurs in the fabrication of stator assemblies for electric motors wherein a series of laminations are individually stacked and aligned. One possible sequence of fabrication may include the compression of such stacked laminations by a press or other means which enables the individual laminations to be flattened and tightly engage one another before being interconnected and possibly sealed. When compressed into the configuration in which such laminations will take in the resultant stator assembly, it is extremely important to accurately measure the axial length to insure that such stacked laminations will have the appropriate electrical and physical characteristics for desirable operation within a motor. While it is preferrable to insure that each stack of laminations proceeding along a production line has an identical axial length, certain small production tolerances are allowable both under and over the specified axial lamination stack length. Of course, stator axial lengths exceeding predetermined limitations greater or less than the desired axial length necessitates the rejection of the fabricated stator stack. When compressing and monitoring a large number of lamination stacks, the axial length of a particular stack beyond predetermined limitations may be overlooked by an operator or may be inaccurately measured through human error, particularly where close tolerances are required. It is therefore desirable to have an apparatus which precisely measures the axial length of each lamination stack and additionally monitors deviations in axial stator length beyond predetermined over or under limitations from the desired length and provide a distinguishing warning to an operator indicating a required rejection of the monitored stack.

Variable differential transformers have been utilized in many applications for sensing or monitoring the position of a member. For example, linear variable differential transformer circuits have been proposed to provide dual ended outputs connected to a pair of corresponding absolute value circuits both of which are connected to a summing circuit output and a stabilizing amplifier, such as illustrated in Section 17-137, Electronics Engineers' Handbook, D. Fink and A. McKenzie, Copyright 1975. Other systems have employed a variable differential transformer in connection with full-wave rectification circuits employing static elements to supply an output signal proportional to the sensing member movement to a number of signal comparators for comparison with pre-established reference signals, such as shown in the Houpt et al U.S. Pat. No. 3,354,399. Other systems have employed variable differential transformers for sensing the movement of a member by employing a differential transformer with a single ended output connected through a coupling transformer to provide a position responsive output signal, such as shown in the Torn et al U.S. Pat. No. 3,046,553. Other systems have employed positive and negative signal detectors arranged in a comparitor arrangement for providing outputs indicative of predetermined spaced positions of a movable member from a reference position in a differential transformer, such as shown in the Muir U.S. Pat. No. 3,684,961.

SUMMARY OF THE INVENTION

This invention relates to a measuring apparatus wherein a sensing apparatus selectively monitors the position of a sensing member.

In one aspect of the invention, a variable differential transformer provides a movable coupling element operatively connected to the sensing member. The transformer provides an input connected to a varying energy source and an output providing an alternating output signal varying in magnitude and phase in response to the selective movement of the coupling element in accordance with the selective movement of the sensing member. A translating circuit is connected to the transformer output for converting an A.C. signal to a D.C. signal and provides a first predetermined magnitude D.C. absolute value position signal at a position signal output in response to a first predetermined position of the coupling element and a second predetermined magnitude D.C. absolute value position signal different than the first signal in response to a second predetermined element position spaced from the first position. A detector includes a first signaling a first differential amplifier having first and second inputs and a second signaling circuit which may include a second differential amplifier having third and fourth inputs. A circuit is connected to the first and third inputs and to the position signal output and functions to provide a common signal to the first and second differential amplifiers. In addition, a circuit is connected to the first and second differential amplifiers and to the translating circuit and provides differing first and second reference signals to the second and fourth inputs respectively in response to the first predetermined signal and further provides differing third and fourth reference signals to the second and fourth inputs in response to the second predetermined signal. In operation, the first differential amplifier responds to the common and first reference signals to provide a signaling output in response to the first predetermined position while the second differential amplifier responds to the common signal and the fourth reference signal to provide a signaling output in response to the second predetermined position. In a preferred form of the invention, a common circuit is connected to the translating means to provide the common signal which varies in response to the translating circuit output.

The variable differential transformer generates a varying magnetic field through an input winding connected to an energy source while first and second output windings are connected in series electrical circuit opposition to provide a varying different signal at a single ended output in response to the energization of the input winding and the selective positioning of the coupling element connected to move with the sensing member. An amplifying circuit is connected to receive the signal at the single ended output of the variable differential transformer and provides an output to an input circuit of an absolute value circuit varying in response to the varying difference signal. A summing circuit provided by the absolute value circuit is connected to the amplifier output through first and second parallel connected circuits wherein the first circuit includes a resistor and the second circuit includes an inverting amplifier connected in series electrical circuit with a half-wave rectification circuit. With such construction, the absolute value circuit provides a first magnitude unidirectional signal at the summing output in response to a first predetermined position of the sensing member and a second magnitude unidirectional signal different than the first magnitude in response to the second predetermined sensing member position spaced from the first position. A detector is operatively connected to the summing circuit output and provides a first signaling output in response to the first unidirectional signal and a second signaling output in response to the second unidirectional signal. An inverting operational amplifier having a feedback is operatively connected to the summing circuit output and provides a drift stabilized output electrically connected to the detector.

The detector provides a first signaling circuit having a first input operatively connected to the absolute value output and a second input connected to a first signal source varying in response to the absolute value output and a second signaling circuit having a third input connected to the absolute value output and a fourth input connected to a second signaling source varying in response to the absolute value output. The first variable signal source operatively responds to the first magnitude signal and provides a first reference signal. The first signaling circuit responds to a first predetermined differential magnitude at the first and second inputs provided by the first magnitude signal and first reference signal and provides a first signaling output indicative of the first element position. The second variable signal source operatively responds to the second magnitude signal and provides a second reference signal. The second signaling circuit responds to a second predetermined differential at the third and fourth inputs provided by the second magnitude signal and second reference signal and provides a second signaling output indicative of the second element position.

In a preferred embodiment of the invention, the first and second variable signal sources each include a varying voltage dividing circuit having a constant potential energy source operatively connected to the absolute value circuit output through a series connected circuit including a potentiometer, a preselected resistor and a diode circuit. The second and fourth signaling circuit inputs are each connected to a respective selectively variable tap of the respective potentiometers and to the diode circuits through a corresponding respective capacitor circuit. The first and third inputs of the detector are connected in common and operatively connected to the absolute value circuit output through a selectively adjustable impedance. By selectively adjusting the potentiometers within each first and second variable signal sources and by preselecting the element characteristic values therein, the second and fourth signaling circuit inputs operatively provide differing signaling inputs to the first and second signaling circuits in response to an output of the absolute value circuit.

The first and second signaling circuits preferably provide first and second differential amplifiers each selectively activated to operate switching output circuits in response to the first and second limit positions of the sensing member.

The output detector further includes a meter which is operatively connected to the absolute value output and provides a meter reading which continually tracks the movement of the sensing member.

The measuring apparatus provides a highly accurate operation wherein an alternating output having a predetermined magnitude and phase relationship is provided by the variable differential transformer through a voltage follower operational amplifying circuit to the absolute value circuit. The specific construction of the absolute value circuit converts the alternating input indicative of the specific position of the monitoring element within the variable differential transformer into a direct current signal having varying magnitude indicative or proportional to the positioning of the core member in a highly linearized manner. The summing circuit output of the absolute value circuit is connected to the detector through a first inverting operational amplifier having a feedback connected to the summing circuit output and providing a low pass filtered output connected to a second inverting operational amplifier. The second amplifier provides a feedback connected to the low pass output and provides a drift stabilized output to the detector circuit.

The measuring apparatus provides an extremely linear response which is sensitive to minor deviations in the core member of the variable differential transformer to provide highly accurate results. The measuring apparatus has been found to rapidly respond to movements by the sensing member and monitors small changes in signal magnitude with a high degree of accuracy. The circuit provides a number of variable elements which may be selectively adjusted to meet specific operating conditions and provide the high degree of accuracy required in precise measurements. The measuring apparatus provides repeated reliability displaying a high degree of accuracy.

BRIEF DESCRIPTION OF THE DRAWING

The drawing furnished herewith illustrates a preferred construction of the present invention in which the above advantages and features are clearly disclosed, as well as others which will be clear from the following description.

In the drawing:

FIG. 1 is a front elevational view of a stator lamination compression mechanism employing an electronic length indicator; and FIG. 2 is an electrical circuit schematic employed with the mechanism of FIG. 1.

DESCRIPTION OF THE PREFERRED ILLUSTRATED EMBODIMENT

With reference to the drawing and particularly FIG. 1, a stator lamination compression mechanism 1 provides a supporting platform 2 having an annular projection or base 3 retaining a series of stacked stator laminations 4 which are to be used in an electric motor. A reciprocating compression platform 5 includes an annular projection 6 axially spaced from projection 3 and located above the laminations 4. The platform 5 is movably retained by a pair of spaced cylinders 7 and fixedly connected to a plunger or piston 8 operating within a hydraulic cylinder 9.

In operation, the piston 8 is drawn upwardly by operating fluid within the hydraulic cylinders 7 thereby raising the member 6. A stack of stator laminations 4 are placed upon the base 3 and hydraulic operating fluid within cylinder 9 forces the piston 8 and interconnected projection 6 downwardly thereby compressing the series of stacked stator laminations between projections 3 and 6. It is desirable to provide predetermined pressure upon the stacked laminations to substantially eliminate spaces or deviations between individual adjacent laminations while maintaining a correct predetermined thickness or height of the series of stacked laminations.

An electronic sensor 11 includes an input/output module 12 having a movable arm 13 spaced from the series of laminations 4 and fixedly connected to the movable platform 5. In operation, the rod or arm 13 axially moves in response to movement of projection 6 and functions with the input/output module 12 to provide an electrical output signal varying in accordance with the positioning of sensing arm 13.

With specific reference to FIG. 2, the sensing rod 13 is formed of non-magnetic material and is coupled to a core 15 which forms an active electro-magnetic coupling within a linear variable differential transformer circuit 16. Specifically, a primary winding 17 is magnetically coupled with the core element 15 and is electrically connected to a lead 18 which, in turn, is connected to input terminal 19. The primary winding 17 is also connected to a lead 20 which, in turn, is connected to an input terminal 21 through a current regulator 22 and a variable potentiometer 23. Three resistors 24, 25 and 26 are connected in parallel between the leads 18 and 20 and therefore parallel connected with the primary winding 17.

A primary winding 27 of an iron core transformer 28 is connected between the input terminals 19 and 21 and magnetically coupled to a secondary winding 29, the latter connected to a power supply circuit 30. A full-wave bridge rectifier is diagrammatically illustrated at 31 and provides a pair of input terminals 32 and 33 connected to the primary winding 29. A positive D.C. reference voltage output terminal 34 is connected to an output terminal 35 through a resistor 36. A serially connected capacitor 37 and Zener diode 38 are connected in parallel with resistor 36 so that a cathode circuit 39 of Zener diode 38 is connected to the output terminal 35 while an anode circuit 40 is connected to the system neutral or ground 41. A negative D.C. voltage output terminal 42 of the full-wave rectifier 31 is connected to a negative D.C. reference voltage output terminal 43 through a resistor 44. A Zener diode 45 provides an anode circuit 46 connected to resistor 44 and a cathode circuit 47 connected to the system neutral 41. A capacitor 48 is connected between the bridge output lead 42 and the system neutral or ground 41. An unregulated positive D.C. reference voltage $+V_x$ is provided at an output terminal 49 which, in turn, is directly connected to the positive D.C. voltage output terminal 34 provided by rectifier 31. The secondary winding 29 provides a center tap 50 which is connected to the system neutral or ground 41.

The linear variable differential transformer circuit 16 includes a pair of output windings 51 and 52 which are electromagnetically coupled with the core element 15 and the primary winding 17. The windings 51 and 52 are uniformly wound in a common direction with winding 51 having a connecting lead 53 serially connected to a lead 54 of winding 52. An output lead 55 of winding 51 is connected to a non-inverting input 56 of an operational amplifier 57. An output lead 58 of winding 52 is connected to a non-inverting input 59 of an operational amplifier 60 and to the system ground or neutral lead 41.

An output lead 61 of operational amplifier 57 is connected to an inverting input 62 of operational amplifier 60 through a resistor 63. The output lead 61 is also connected to an inverting input 64 of operational amplifier 57. The operational amplifier 57 is preferably operated near unity gain and functions as a voltage follower in operation.

An output circuit 65 of operational amplifier 60 is connected to the inverting input 62 through a series connected circuit 66 including a diode 67 and a resistor 68. Specifically, an anode circuit 69 of diode 67 is connected to the output 65 while a cathode circuit 70 is connected to the resistor 68. The output 65 of operational amplifier 60 is also connected to the inverting input 62 through a series circuit 71 including a diode 72 and a resistor 73. Specifically, a cathode circuit 74 of diode 72 is connected to the output 65 while an anode circuit 75 is connected to the resistor 73. The anode circuit 75 of diode 72 is also connected to an inverting input 76 of an operational amplifier 77 through a resistor 78. The output 61 of operational amplifier 57 is also connected to the inverting input 76 of operational amplifier 77 through a resistor 79. A non-inverting input 80 of operational amplifier 77 is connected to lead 58 of the secondary winding 52 and to the system neutral or ground lead 41.

An output 81 provided by operational amplifier 77 is connected to an inverting input 82 of an operational amplifier 83 through a resistor 84. The output 81 is also connected to the inverting input 76 of operational amplifier 77 through a feedback circuit 85 including a parallel connected resistor 86 and capacitor 87 to produce a low pass filtered output. A non-inverting input 88 of amplifier 83 is connected through a resistor 89 to the output lead 58 of winding 52 and to the system neutral or ground lead 41. An output 90 of amplifier 83 is connected to the inverting input 82 through a resistor 91 and is also connected to the system neutral or ground 41 through a variable tapped potentiometer 92 to produce a drift stabilized output. A variable tap 93 of potentiometer 92 is electrically connected to a variable tap 94 of a variable potentiometer 95. An output lead 96 of variable potentiometer 95 is connected to a non-inverting input 97 of an operational amplifier 98 and an inverting input 99 of an operational amplifier 100. A milliammeter 101 is connected between the output lead 96 and the system neutral or ground 41.

A non-inverting input 102 of amplifier 100 is connected to a variable reference source 103 while an inverting input 104 of amplifier 98 is connected to a variable reference source 105. The variable source 103 includes a variable potentiometer 106 having an input connected to terminal 35 and receiving the regulated constant positive potential reference signal $+V$. The variable potentiometer 106 is connected in series with a resistor 107 which, in turn, is connected to a junction circuit 108. A variable tap 109 of potentiometer 106 is connected to the non-inverting input 102 of amplifier 100. A capacitor 110 is connected between the non-inverting input 102 and the junction circuit 108. The variable source 105 likewise includes a variable potentiometer 111 having an input connected to the terminal 35 for receiving the regulated constant positive potential reference signal $+V$. The potentiometer 111 provides an output tap 112 connected to the inverting input 104 of amplifier 98. The variable potentiometer 111 is connected to the junction circuit 108 through a resistor 113 while a capacitor 114 is connected between the inverting input 104 and the junction circuit 108. The junction circuit 108 is connected to the system ground or neutral 41 through a resistor 115 and is also connected to the output 90 of the operational amplifier 83 through a series connected circuit 116 including the diodes 117, 118 and 119. The anode circuits of diodes 118 and 119 are connected to the cathode circuits of diodes 117 and 118, respectively, while the anode circuit of diode 117 is connected to junction lead 108. The cathode circuit of diode 119 is directly connected to the output 90 of the operational amplifier 83.

An output circuit 120 of operational amplifier 100 is connected to an anode circuit of a diode 121 which, in turn, provides a cathode circuit electrically connected to a base circuit 122 of an NPN type transistor 123 through a resistor 124. An emitter circuit 125 of transistor 123 is coupled to the system neutral or ground 41 while a collector circuit 126 is connected to the terminal 49 supplying the unregulated reference voltage $+V_x$ through a relay coil 127. A protective diode 128 is connected across the relay coil 127. A set of normally open contacts 129 are operatively controlled by the relay coil 127 and are serially connected in circuit between the terminal 35 supplying the constant positive reference voltage $+V$ and the system ground lead 41 through a light 130 or other warning device. An output circuit 131 of operational amplifier 98 is connected to an anode circuit of a diode 132 which, in turn, provides a cathode circuit connected through a resistor 133 to a base circuit 134 of a switching transistor 135. The NPN type transistor 135 provides an emitter circuit 136 connected to the system ground lead 41 and further provides a collector circuit 137 connected through a relay coil 138 to the terminal 49 supplying the unregulated positive reference voltage $+V_x$. A diode 139 is connected in parallel with coil 138 for protection. A set of normally open contacts 140 is controlled by the relay coil 138 for selectively energizing a light 141 or other warning device through a series connected circuit including the constant positive reference voltage terminal 35, the contacts 140, the light 141, and the system neutral or ground lead 41. The operational amplifiers 57, 60, 77, 83, 98 and 100 may be selected from the 741 series such as LM741 or LM741CN as provided by National Semiconductor.

When activated, an external switching circuit (not shown) applies a 60 hertz, 120 volt A.C. signal at input terminals 19 and 21 thereby providing the regulated constant reference voltages $+V$ and $-V$ at terminals 35 and 43, respectively, and the unregulated reference voltage $+V_x$ at terminal 49. The transistor circuits 123 and 135 are normally non-conductive and the contacts 129 and 140 remain in an opened condition with lights 130 and 141 de-activated.

When operated, the compression mechanism 1 operates to firmly engage the stack of stator laminations 4 between the projections 3 and 6. With the laminations 4 being firmly compressed between the spaced members 3 and 6, the sensing rod 13 is correspondingly positioned through the positioning of platform 5 to accurately monitor the axial length or height of the series of stacked laminations 4. With the laminations 4 at a desired compressed predetermined axial length or height, the core member 15 is located at a first predetermined or null position to provide a first predetermined coupling between the secondary coils 51 and 52 and the primary coil 17 within the linear variable differential transformer circuit 16. With such first predetermined coupling, an output signal of a first predetermined magnitude and the phase relationship will be supplied to the voltage follower 57 through lead 56 in response to the summation of opposing signals through the bucking interconnection of the coils 51 and 52.

With the core element 15 located at the first predetermined or null position thereby indicating a desired predetermined lamination axial length, the output of operational amplifier 57 will substantially provide the first predetermined differential magnitude and phase relationship as supplied to input 56. The input 76 operates as a signal summing circuit and combines the alternating signal appearing at output 61 with its half-wave rectified version provided by the operational amplifier 60 and interconnected circuitry including diodes 67 and 72. The magnitude of the half-wave rectified signal supplied through resistor 78 is substantially greater than the magnitude of the signal supplied through resistor 79 and the signal summation at input 76 provides a fully rectified first average magnitude direct current signal of a first negative polarity proportional to the first predetermined signal at input 56 corresponding to the desired first sensor position. The operational amplifier 77 responds to the first D.C. signal at the summing input 76 and provides a stabilized output of a second positive polarity which, in turn, is amplified and stabilized by amplifier 83 to provide a first substantially constant output of the first negative polarity at output 90.

The first constant output at 90 is supplied to the inverting input 99 of the differential amplifier 100 and to the non-inverting input 97 of differential amplifier 98 through a series connected circuit including the potentiometers 92 and 95. The variable signal sources 103 and 105 also respond to the first constant output at 90 through the diode circuit 116. The signal source 103 may, for example, be constructed of preselected component values so as to provide a negative polarity reference signal at the non-inverting input 102 in response to the first constant output at 90 corresponding to the null or desired positioning of core 15 and sensing member 13. Under such a null condition, the differential amplifier 100 will not respond to the differential input at terminals 99 and 102 and therefore will not operate to activate the switching transistor 123 which remains turned "OFF". The variable signal source 105 will also respond to the first constant output at 90 corresponding to the null position of core 15 and may, for example, be designed with circuit components so as to provide a positive polarity reference signal at the inverting input 104 of the differential amplifier 98. In a null condition where the first constant output appears at 90, the differential voltage between inputs 97 and 104 is not sufficient to activate the differential amplifier 98 and the switching transistor 135 therefore remains de-activated or turned "OFF".

The meter 101 is connected to continuously monitor or track the output at 90 through the series connected circuit including the potentiometers 92 and 95. With the core element 15 located at a null or desired position, the meter 101 can be calibrated to provide a reading corresponding to such null or desired position of the sensing member 13.

While it is, of course, desirable to monitor an exact null position for each stack of stator laminations 4 thereby indicating an exact desired axial length, slight tolerances or deviations in axial length are permitted within a desirable stator structure for an electric motor. Sensed deviations beyond predetermined limits, either above or below the established desired axial length, will necessitate a rejection of a stack of laminations 4. It is therefore extremely important to quickly and accurately monitor a large number of lamination stacks which may be progressing along an assembly line for easy and quick determination as to whether a particular stack should be rejected. One possible approach is to monitor the axial length while the stacked laminations are undergoing a compression sequence. An operator may therefore monitor the continuously tracking meter 101 and determine the exact deviation either above or below the norm or desired axial length for each lamination stack. Because of the repetition of production line fabrications, it is possible that a reading provided by meter 101 might be overlooked by an operator. The differential amplifiers 98 and 100 and associated output circuits thus provide a prompt warning whenever a stack of laminations is either greater or less than predetermined limits from the desired axial length.

For the purpose of illustration, movement of the sensing member 13 and interconnected core member 15 to a predetermined point spaced from the null position in response to a short lamination stack and therefore beyond the acceptable deviation limitation will operatively provide a second signal at the single ended output 56 having a magnitude and phase relationship which differs from the signal provided when the core member 15 was at the null position. The summing circuit at input 76 of amplifier 77 provides a second average magnitude D.C. signal of the first polarity in response to the second signal at 56 and amplifier 83 provides a second substantially constant output of the first polarity. A signal directly proportional to the second constant output at 90 will appear at inputs 97 and 99 of the differential amplifiers 98 and 100, respectively. The variable signal source 105 will respond to the second constant output at 90 to provide a second reference signal at the inverting input 104 which may, for example, be of a negative polarity signal. In such case, the differential voltage between inputs 97 and 104 will not be sufficient to activate amplifier 98 and the switching transistor 135 will remain in the de-activated or "OFF" condition. The variable signal source 103, however, responds to the second constant output at 90 and provides a reference signal having a substantial negative polarity magnitude so that a significant differential magnitude of a predetermined value is established between input terminals 99 and 102. The differential amplifier 100 thus responds to provide a switching function and provide a positive potential output at 120 operative to turn the switching circuit 123 "ON". With transistor 123 conducting, the relay 127 becomes energized and closes the associated contacts 129 to energize the signal 130. An operator attending the compression mechanism 1 is warned by signal 130 that the stator axial length is undesirable and must be rejected.

In a situation where the lamination axial length is beyond the acceptable limitation, the sensing member 13 will be located at a third position spaced from the null and second positions previously described. With the core member 15 in the third position, the single ended output 56 provides a third magnitude and phase signal while the summing circuit 76 responds to provide a third average magnitude D.C. signal of the first polarity. The output 90 of amplifier 83 will provide a third substantially constant output of the first polarity which is proportionately applied to inputs 97 and 99. The variable signal source 103 responds to the third constant output at 90 to provide a reference signal to the non-inverting input 102 which may, for example, be of a positive polarity and substantially different from the reference signals supplied at the null or second sensing positions of core member 15. When at the third position, the differential magnitude at the inputs 99 and 102 is not sufficient to activate the differential amplifier 100 and the switching circuit 123 remains de-activated or turned "OFF". The variable signal source 105, however, responds to the third constant output at 90 to provide a reference signal of positive polarity at the inverting input 104 which differs substantially from the reference signals supplied when the core member 15 was in the neutral or second positions. With the third constant output at 90, the differential voltage at input terminals 97 and 104 is at a predetermined magnitude sufficient to operate the differential amplifier 98 which thereby provides a positive conducting signal at output 131 sufficient to activate the switching transistor 135. With transistor 135 conducting, the relay 138 is energized and closes the contacts 140 to energize the warning 141. An operator is therefore warned by signal 141 that the axial length of the laminations 4 is beyond the normal acceptable limits and must be rejected. It is noted that the predetermined differential magnitude at inputs 97 and 104 required for activating the differential amplifier 98 may differ from the predetermined differential magnitude at inputs 99 and 102 required for activating the differential amplifier 100.

The system thus provides highly accurate monitoring of varying axial lengths of stator laminations which is simultaneously accomplished in connection with a stator lamination compressing sequence. The electronic circuitry accurately monitors the single ended output of the linear variable differential transformer and detects variances in phase and amplitude of the differential transformer output.

The system provides a construction which may be adjusted to provide high gain and good sensitivity in tracking the monitoring sequence. The circuit provides an extremely linear output and fast response to changes in the monitoring input. The system desirably detects signal changes of a very small magnitude with repeated reliability and displays a high degree of accuracy.

Various modes of carrying out the invention are contemplated as being within the scope of the following claims particularly pointing out and distinctly claiming the subject matter which is regarded as the invention.

I claim :

1. A measuring apparatus, comprising a position sensing member, a variable differential transformer having a movable coupling element operatively connected to said position sensing member and an output connected to a varying energy source and an output providing an alternating output signal varying in amplitude and phase in response to the selective movement of said coupling element according to the selective movement of said sensing member, translating means for converting an A.C. signal to a D.C. signal and having an input operatively connected to said transformer output and having a position signal output providing a first predetermined magnitude D.C. absolute value position signal in response to a first predetermined position of said coupling element and a second predetermined magnitude D.C. absolute value position signal different than said first magnitude D.C. absolute value position signal in response to a second predetermined element position spaced from said first position, a first signal source having first reference signal means and connected to the position signal output of the translating means to produce a first reference signal varying in accordance with said position signal, a second signal source having a second reference signal means and connected to the position signal output of the translating means to produce a second reference signal varying in accordance with said position signal, and a detector including a first signaling circuit having a first input operatively connected to said position signal output and a second input connected to said first signal source, a second signaling circuit having a third input connected to said position signal output and a fourth input connected to said second signal source, said first signaling circuit responding to a first predetermined differential magnitude at said first and second inputs in response to said first magnitude D.C. absolute value position signal and providing a first signaling output indicative of said first element position, said second signaling circuit responding to a second predetermined differential magnitude at said third and fourth inputs in response to said second magnitude D.C. absolute value signal and providing a second signaling output indicative of said second element position.

2. The measuring apparatus of claim 1, wherein said detector includes a meter operatively connected to said position signal output and providing a meter reading which continuously tracks the movement of said sensing member.

3. The measuring apparatus of claim 1, wherein said first and third inputs of said detector are connected in common and operatively connected to said position signal output through a selectively adjustable impedance.

4. The measuring apparatus of claim 1, wherein said first and second signal sources each include a varying voltage dividing circuit having a constant potential energy source operatively connected to said position signal output through a series connected circuit including a potentiometer, a preselected resistor and a diode circuit with said second and fourth signaling circuit inputs each connected to a respective selectively variable tap of said respective potentiometer and to said diode circuit through a respective capacitor.

5. The measuring apparatus of claim 4, wherein said preselected resistor of said first variable signal source differs in magnitude with respect to the preselected resistor of said second variable signal source.

6. The measuring apparatus of claim 1, wherein said first signaling circuit includes a first differential amplifier having an output connected to a first switching circuit selectively transferrable from a first condition to a second condition in response to said first predetermined differential magnitude, and said second signaling circuit includes a second differential amplifier having an output connected to a second switching circuit selectively transferrable from a first condition to a second condition in response to said second predetermined differential magnitude.

7. A measuring apparatus, comprising a position sensing member, a variable differential transformer having a movable coupling element operatively connected to said position sensing member and an input connected to a varying energy source and an output providing an alternating output signal varying in amplitude and phase in response to the selective movement of said coupling element according to the selective movement of said sensing member, translating means converting an A.C. signal to a D.C. signal and having an input operatively connected to said transformer output and a position signal output providing a first predetermined D.C. absolute value position signal in response to a first predetermined position of said coupling element and a second predetermined D.C. absolute value position signal different than said first position signal in response to a second predetermined element position spaced from said first position, a detector including a first differential amplifier having first and second inputs and a second differential amplifier having third and fourth inputs, means connecting said first and third inputs to said position signal output and providing a common signal to said first and third inputs of said first and second differential amplifiers, and reference signal means providing first and second reference signals and connected to said position signal output of said translating means to produce differing first and second modified reference signals in accordance with the position signal and connected to said first and second differential amplifiers and providing differing first and second modified reference signal to said second and fourth inputs respectively in response to said first and second predetermined position signals, said first differential amplifier responding to said common and first modified reference signal and providing a signaling output in response to said first predetermined position and said second differential amplifier responding to said common and second modified reference signal and providing a signaling output in response to said second predetermined position.

8. A measuring apparatus, comprising a sensing member, a variable differential transformer having an input winding connected to an energy source and generating a varying magnetic field and first and second output windings connected in series electrical circuit opposition and providing a varying difference signal at a single ended output in response to the energization of said input winding and the selective positioning of an element connected to move with said sensing member and regulating the electro-magnetic coupling between said input and output windings, a signal translating circuit having an amplifier connected to said single ended output and providing a first A.C. output varying in response to said varying difference signal and a second amplifier connected to said A.C. output and including a half-wave rectification circuit with a D.C. output which is a half-wave rectified signal of said A.C. output, said signal translating circuit including a summing circuit connected to said A.C output and said D.C. output and combining the output signals of the amplifiers to produce a position signal output providing a first magnitude unidirectional absolute value position signal in response to a first predetermined position of said sensing member and a second magnitude unidirectional absolute value position signal different than said first magnitude position signal in response to a second predetermined sensing member position spaced from said first position, said summing circuit connected to said first and second amplifiers through first and second parallel connected circuits with said first circuit including a resistor and said second circuit including an inverting amplifier connected in series electrical circuit with said half-wave rectification circuit of said second amplifier, a first signal source having first reference signal means and connected to the position signal output of the translating means to produce a first reference signal varying in accordance with said position signal, a second signal source having a second reference signal means and connected to the position signal output of the translating means to produce a second reference signal varying in accordance with said position signal, and a detector operatively connected to said summing circuit output and to said reference signal means and providing a first signaling output in response to said first unidirectional absolute value position signal and a second signaling output in response to said second unidirectional absolute value position signal.

9. The measuring apparatus of claim 8, and including an inverting operational amplifier having an input connected to said summing circuit output and having a feedback means operatively connected between the output of the inverting operational amplifier and the input connected to said summing circuit output and providing a drift stabilized output electrically connected to said detector.

10. A measuring apparatus, comprising a sensing member, a primary winding selectively connected to an A.C. power source and generating a magnetic field, first and second secondary windings electromagnetically coupled with said primary winding and connected in series electrical circuit opposition and providing an A.C. difference signal at a single ended output in response to the energization of said primary winding, a core member of magnetic operatively connected to said sensing member and selectively positioned along an axis adjacent said primary and secondary windings in accordance with the movement of said sensing member and varying the inductive coupling between said windings, a voltage follower operational amplifying circuit having a non-inverting input circuit of high impedance connected to said single ended output and a low impedance output circuit providing an A.C. output substantially proportional to said A.C. difference signal, a signal translating circuit including a summing circuit connected to said voltage follower output circuit through first and second parallel connected circuits with said first circuit including a resistor and said second circuit including an inverting amplifier connected in series electrical circuit with a half-wave rectification circuit and having an output, said summing circuit providing a first magnitude D.C. absolute value position signal of a given polarity in response to a first predetermined position of said core member and a second magnitude D.C. absolute value position signal of said given polarity in response to a second predetermined position of said core member along said axis spaced from said first position and a third magnitude D.C. absolute value position signal of said given polarity in response to a third predetermined position of said core member along said axis spaced from said first position in a direction opposite from said second position, said translating circuit including an output circuit including a first inverting operational amplifier having an input connected to said output of said summing circuit and having a feedback circuit including filter means connected to the output of said summing circuit for providing a low pass filtered output, said output circuit of said translating circuit including a second inverting operational amplifier having an input connected to said low pass filtered output and a feedback means connected to said input of the second inverting operational amplifier for providing a drift stabilized output, and a detector circuit including first and second variable signal sources, said first variable signal source including a reference signal means and connected to and operatively responding to said second magnitude D.C. absolute value position signal to provide a first modified reference signal, said second source including a reference signal means and connected to and operatively responding to said third magnitude D.C. absolute value position signal to provide a second modified reference signal different than said first reference signal, said detector circuit including a first differential amplifier having a first inverting input electrically connected to receive said drift stabilized output and a first non-inverting input electrically connected to receive said drift stabilized output and a second inverting input connected to a said second signal source, and said second differential amplifier responding to a second predetermined differential magnitude at said second inverting and noninverting inputs in response to said third magnitude signal to provide a second signaling output indicative of said third reference position of said core member.

11. The measuring apparatus of claim 10, wherein said detector circuit includes a meter operatively connected to said drift stabilized output and providing a meter reading which continuously tracks the movement of said sensing member.

* * * * *

UNITED STATES PATENT AND TRADEMARK OFFICE
CERTIFICATE OF CORRECTION

PATENT NO. : 4,109,200

DATED : August 22, 1978

INVENTOR(S) : Dennis A. McNulty

It is certified that error appears in the above-identified patent and that said Letters Patent are hereby corrected as shown below:

Column 2, Line 31, After the word "signaling" insert ---circuit which may include---

Column 10, Line 53, Cancel "output" and substitute therefor ---input---

Column 12, Line 22, Cancel "signal" and substitute therefor ---signals---

Column 13, Line 27, After the word "magnetic" insert--- material---

Signed and Sealed this

Twenty-seventh Day of November 1979

[SEAL]

Attest:

RUTH C. MASON
Attesting Officer

LUTRELLE F. PARKER
Acting Commissioner of Patents and Trademarks